United States Patent [19]
Fujii

[11] Patent Number: 5,424,876
[45] Date of Patent: Jun. 13, 1995

[54] SURFACE REFLECTING MIRROR HAVING A SILICON DIOXIDE UNDER LAYER

[75] Inventor: Hideo Fujii, Tokyo, Japan

[73] Assignee: Asahi Kogaku Kogyo Kabushiki Kaisha, Tokyo, Japan

[21] Appl. No.: 968,481

[22] Filed: Oct. 29, 1992

[30] Foreign Application Priority Data

Oct. 31, 1991 [JP] Japan .................. 3-349304
Apr. 3, 1992 [JP] Japan .................. 4-110831

[51] Int. Cl.⁶ .......................... G02B 5/22; G02B 5/26; B32B 9/00; B05D 1/36
[52] U.S. Cl. .......................... 359/884; 359/883; 359/584; 359/585; 428/688; 428/698; 427/419.2; 427/419.7
[58] Field of Search ............... 359/883, 884, 584, 585, 359/589; 428/688, 689, 698; 427/419.2, 419.7

[56] References Cited

U.S. PATENT DOCUMENTS

| | | | |
|---|---|---|---|
| 4,451,119 | 5/1984 | Meyers et al. | 359/846 |
| 4,482,209 | 11/1984 | Grewal et al. | 359/883 |
| 4,548,691 | 10/1985 | Dietrich et al. | 204/192 |
| 4,944,581 | 7/1990 | Ichikawa | 359/883 |
| 4,979,802 | 12/1990 | Ichikawa | 359/580 |
| 5,019,458 | 5/1991 | Elgat et al. | 428/630 |
| 5,216,551 | 6/1993 | Fujii | 359/884 |

FOREIGN PATENT DOCUMENTS

| | | |
|---|---|---|
| 60-131501 | 7/1985 | Japan ............... G02B 5/08 |
| 1591064 | 6/1981 | United Kingdom . |
| 2229738 | 10/1990 | United Kingdom . |
| 2241709 | 9/1991 | United Kingdom . |

OTHER PUBLICATIONS

"Reflectance and Durability of Ag Mirrors Coated With Thin Layers of $Al_2O_3$ Plus Reactively Deposited Silicon Oxide", G. Hass et al, *Applied Optics*, vol. 14, No. 11, Nov. 1975, pp. 2639–2644.

"Progress in the Development of a Durable Silver-Based High-Reflectance Coating for Astronomical Telescopes", Dar-Yuan Song et al, *Applied Optics*, vol. 24, No. 8, Apr. 1985 pp. 1164–1170.

British Search Report GB 9222448.4 dated Nov. 29, 1993.

Japanese Patent Abstract 60-131501 dated Jul. 13, 1985.
Japanese Patent Abstract 56161503 dated Dec. 11, 1981.

*Primary Examiner*—Loha Ben
*Assistant Examiner*—Darryl J. Collins
*Attorney, Agent, or Firm*—Sughrue, Mion, Zinn, Macpeak & Seas

[57] ABSTRACT

A high-reflectivity surface reflecting mirror is provided by sequentially forming, on a resin substrate, a silicon dioxide first under layer, a chromium sulfide second under layer, a silver reflecting layer and protective layers. According to a second aspect of the invention, a surface reflecting mirror is provided by sequentially forming, on a resin substrate, a silicon dioxide under layer, an aluminum reflecting layer, a silicon dioxide first protective layer, a second protective layer made of at least one of titanium oxide, tantalum oxide and zirconium oxide, and an aluminum oxide third protective layer.

3 Claims, 3 Drawing Sheets

SURFACE REFLECTING MIRROR HAVING A SILICON DIOXIDE UNDER LAYER

BACKGROUND OF THE INVENTION

This application is based on and claims priorities from Japanese Patent Application Nos. Hei. 3-349304 filed Oct. 31, 1991 and Hei. 4-110831 filed Apr. 3, 1992, the disclosures of which are incorporated by reference herein.

The present invention relates to a surface reflecting mirror having a surface reflecting multilayer film that is used in optical products such as cameras, telescopes and microscopes.

In a surface reflecting mirror used in optical products such as cameras, telescopes and microscopes, aluminum is most commonly used as a reflecting material. However, sufficient resistance to scratching, resistance to humidification, etc. cannot be obtained simply by forming an aluminum reflecting layer on a substrate. Conventionally, this problem has been solved by forming a protective layer of an oxide of silicon, magnesium fluoride, etc.

Silver, which has a high reflectivity over a visible to near infrared range, is commonly used as a reflecting material for a high-reflectivity surface reflecting mirror that is used in optical products. However, a single layer film of silver is inferior in film adhesiveness, resistance to humidification, resistance to sulfurizing, etc. In order to improve these characteristics, a multilayer film is formed by the silver single layer film, an under layer and protective layers.

The durability of this type of high-reflectivity surface reflecting mirror is evaluated by an accelerated test for resistance to humidification at 40°-60° C. When the above high-reflectivity surface reflecting mirror was subjected to a test for resistance to humidification at 60° C. and 90% RH for 24 hours, it was sometimes the case that the laminate films peeled off from the substrate to cause point-like defects. It is considered that the point-like defects are caused by the thermal expansion or the swelling by damping of the resin.

Although the point-like defects gradually disappear if the reflecting mirror is again placed in a usual atmosphere, they will deteriorate the film adhesiveness to thereby lower the durability of the reflecting film.

In recent years, due to the development of ultra-high-precision die-machining tools and the improvements of the injection molding technique, resins have come to be used as optical members. In particular, engineering plastics such as a polycarbonate resin and a polyacetal resin are superior in durability, and can be used at a high temperature. However, even with the engineering plastics the problems originating from the occurrence of the point-like defects have not been solved yet.

SUMMARY OF THE INVENTION

An object of the present invention is to provide a high-reflectivity surface reflecting mirror having superior film adhesiveness, resistance to corrosion, durability and optical characteristics by preventing the occurrence of point-like defects.

Another object of the invention is to provide a surface reflecting mirror in which no point-like defects occur between a resin substrate and a reflecting film structure even in a high temperature, high humidity atmosphere.

According to the invention, a surface reflecting mirror comprises:
a resin substrate;
a first under layer made of silicon dioxide and formed on the resin substrate;
a second under layer made of chromium sulfide and formed on the first under layer;
a reflecting layer made of silver and formed on the second under layer; and
a protective layer formed on the reflecting layer.

By forming the silicon dioxide first under layer having a compressive internal stress between the resin substrate and the surface reflecting films, a tensile stress imposed by the surface reflecting films on the resin substrate under high temperature and high humidity conditions can be compensated, so that the point-like defects can be prevented.

According to a second aspect of the invention, a surface reflecting mirror comprises:
a resin substrate;
an under layer made of silicon dioxide and formed on the resin substrate;
a reflecting layer made of aluminum and formed on the under layer;
a first protective layer made of silicon dioxide and formed on the reflecting layer;
a second protective layer made of at least one material selected from the group consisting of titanium oxide, tantalum oxide and zirconium oxide, and formed on the first protective layer; and
a third protective layer made of aluminum oxide and formed on the second protective layer.

In the second aspect of the invention, silicon dioxide is employed as a material for the under layer. The silicon dioxide under layer imposes a compressive stress on the resin substrate, and its thickness can be changed without having any influences on the optical characteristics of the surface reflecting mirror. By freely adjusting the thickness of the under layer without the need of considering the optical characteristics, a tensile stress imposed by the entire reflecting film structure on the substrate can be reduced or changed to a compressive stress. As a result, a surface reflecting mirror can be provided which is hardly bent, and in which no point-like defects occur between the resin substrate and the reflecting film structure, by virtue of a reduced influence of the expansion of the substrate even in a high temperature, high humidity atmosphere.

DESCRIPTION OF THE PREFERRED EMBODIMENTS

In studying the causes of the point-like defects, the present inventor has found the following phenomenon.

Figure 6:
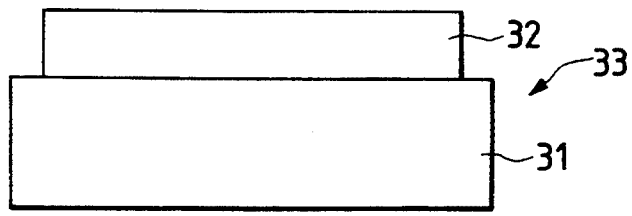
FIG. 6 is a side view showing a surface reflecting mirror under a normal condition.
Figure 7:
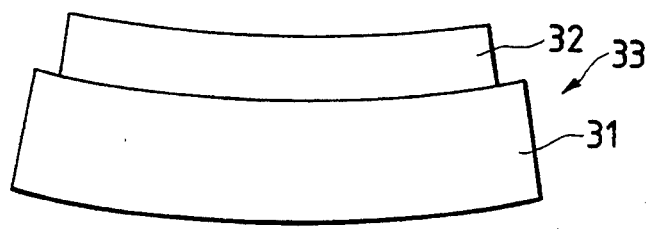
FIG. 7 is a side view showing how a surface reflecting mirror is bent in a high temperature, high humidity atmosphere.

When, for example, a surface reflecting mirror 33 having a resin substrate 31 and a reflecting film structure 32 formed thereon (see FIG. 6) is placed in a high temperature, high humidity atmosphere, the reflecting film structure 32 expands only slightly in contrast to a large thermal expansion or damping expansion of the resin substrate 31. Therefore, as shown in FIG. 7, the surface reflecting mirror 33 bends to assume a shape concave to the side of the reflecting film structure 32. This bending due to the expansion of the substrate 31 is the main cause of the point-like defects.

Figure 8:
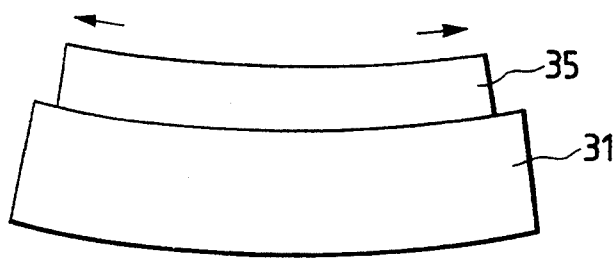
FIG. 8 is a side view illustrating a tensile stress in a surface reflecting mirror.
Figure 9:
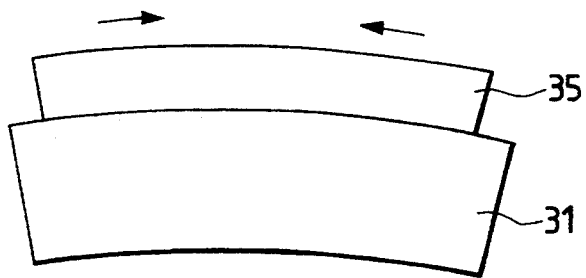
FIG. 9 is a side view illustrating a compressive stress in a surface reflecting mirror.

Further, if a unit layer 35 of reflecting films, protective films, or the like is formed on the resin substrate 31, a tensile stress or compressive stress remains in the unit film 35 as shown in FIGS. 8 and 9.

The residual tensile stress tends to bend the surface reflecting mirror 33 so that it assumes a shape concave to the side of the unit film 35, as shown in FIG. 8. On the other hand, the residual compressive stress tends to bend the surface reflecting mirror 33 so that it assumes a shape concave to the side of the substrate 31, as shown in FIG. 9.

Figure 4:
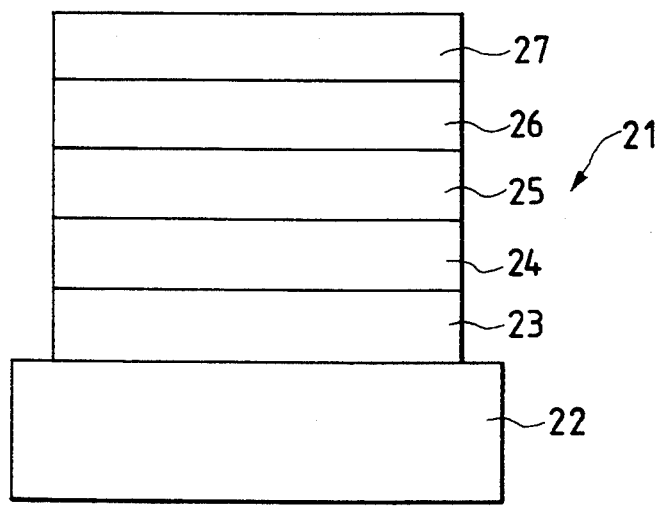
FIG. 4 is a side view showing a surface reflecting mirror.

Measurements of a surface shape variation before and after the formation of a unit film on the substrate have revealed that in the case of the surface reflecting mirror 21 as shown in FIG. 4, among the films 23-27 formed on the resin substrate 22, the tensile stress remains in the under layer 23 made of chromium oxide, the reflecting layer 24 made of aluminum, the second protective layer 26 made of titanium oxide, tantalum oxide or zirconium oxide and the third protective layer 27 made of aluminum oxide while the compressive stress remains in the first protective layer 25 made of silicon dioxide. That is, in the surface reflecting mirror 21, the entire reflecting film structure imposes the tensile stress on the resin substrate 22. Therefore, when the surface reflecting mirror 21 is placed in a high temperature, high humidity atmosphere, it is easily bent so as to assume a shape concave to the side of the reflecting film structure due to the thermal expansion or damping expansion of the substrate 22.

Figure 1:
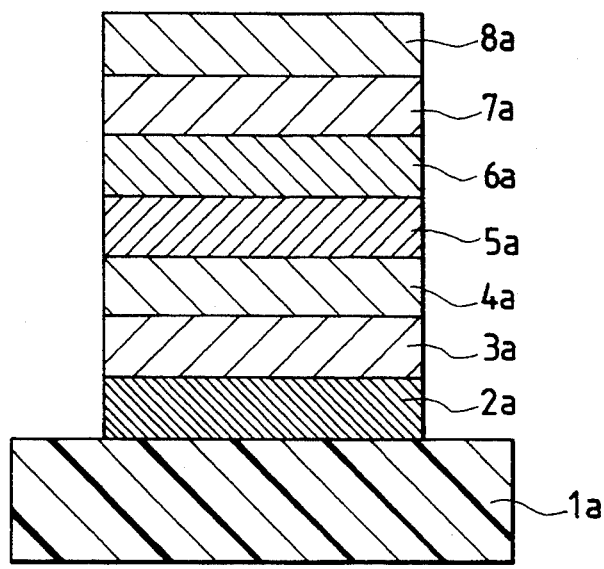
FIG. 1 is a sectional view showing a high-reflectivity surface reflecting mirror according to a first embodiment of the present invention.

FIG. 1 schematically shows a high-reflectivity surface reflecting mirror having a layered structure according to a first embodiment of the present invention.

The surface reflecting mirror of the first embodiment has seven layers, each of which is formed by vacuum evaporation, sputtering or the like.

As shown in FIG. 1, a silicon dioxide first under layer 2a, a chromium sulfide second under layer 3a, a silver reflecting layer 4a, a chromium sulfide first protective layer 5a, a silicon dioxide second protective layer 6a, an aluminum oxide third protective layer 7a and a silicon dioxide fourth protective layer 8a are sequentially formed on a substrate 1a.

The substrate 1a is made of a resin material without any specific limitations thereon. The resin material may be a polycarbonate resin, polyacetal resin, acrylic resin, polystyrene resin, polyimide resin, polyethylene terephthalate resin, plybutylene terephthalate resin, ABS resin, or the like.

The thickness of the first under layer 2a made of silicon dioxide is preferably within the range of 25-100 nm, and is most preferably within the range of 50-75 nm. The internal stress of the first under layer 2a is a compressive stress.

Figure 2:
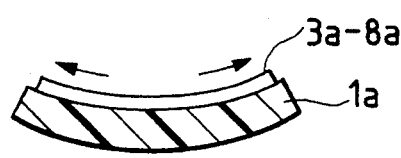
FIGS. 2 and 3 are sectional views illustrating a tensile stress and a compressive stress in the surface reflecting mirror of the first embodiment.

The first under layer 2a is inserted to compensate the a difference in thermal expansion or a difference in expansion due to moisture absorption between the resin substrate 1a and the surface reflecting films 3a-8a (described later). Since the thermal expansion coefficient of the resin substrate 1a is larger than the surface reflecting films 3a-8a, when the laminate body consisting of the resin substrate 1a and the surface reflecting films 3a-8a is heated, a tensile stress occurs in the surface reflecting films 3a-8a and the whole laminate body is bent so as to assume a shape concave to the side of the surface reflecting films 3a-8a (see FIG. 2). The tensile stress occurring in the surface reflecting films 3a-8a under high-temperature and high-humidity conditions is compensated by the compressive internal stress of the first under layer 2a inserted between the resin substrate 1a and the surface reflecting films 3a-8a, so that the laminate body can be prevented from bending.

Figure 3:
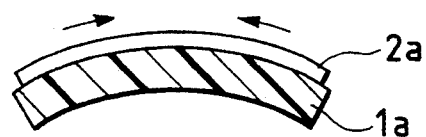

While the tensile stress in the surface reflecting films 3a-8a tends to bend the resin substrate 1a so as to assume a shape concave to the side of the surface reflecting films 3a-8a (see FIG. 2), the compressive stress in the first under layer 2a tends to bend the resin substrate 1a so as to assume a shape concave to the side of the resin substrate 1a (see FIG. 3). Therefore, the bend of the laminate body clue to the difference in thermal expansion between the resin substrate 1a and the surface reflecting films 3a-8a can be lessened by inserting, between the resin substrate 1a and the surface reflecting films 3a-8a, the silicon dioxide first under layer 2a in which the compressive stress occurs.

Since a silicon dioxide layer should not be inserted above the second under layer 3a to maintain sufficient resistance to scratching, resistance to corrosion, film adhesiveness and optical characteristics, the first under layer 2a having a necessary thickness is inserted only between the resin substrate 1a and the second under layer 3a. With this structure, a high-reflectivity surface reflecting mirror can be obtained in which no point-like defects occur even in a test for resistance to humidification that is performed at 60° C. and 90% RH for 24 hours.

The second under layer 3a made of chromium sulfide has a thickness preferably within the range of 1-35 nm, and most preferably within the range of 3-11 nm. By virtue of the existence of the second under layer 3a, the reflecting layer 4a can be formed easily at a desired thickness.

The silver reflecting layer 4a formed on the second under layer 3a has a thickness preferably in the range of 50-250 nm, and most preferably within the range of 85-215 nm. The thickness smaller than 50 nm is not appropriate because in such a thickness range a reflecting mirror does not provide complete reflection, i.e., it becomes like a half mirror. The thickness larger than 250 nm is also not appropriate because in such a thickness range the durability is deteriorated.

The first protective layer 5a formed on the silver reflecting layer 4a is made of chromium sulfide to prevent sulfur ions from entering the reflecting layer 4a. The first protective layer 5a has a thickness preferably in the range of 1–10 nm, and most preferably within the range of 2–5 nm. The thickness larger than 10 nm is not appropriate because in such a thickness range light absorptions of chromium sulfide cause a reduction in reflectivity over the entire visible range.

The second protective layer 6a formed on the first protective layer 5a is made of silicon dioxide, and serves in combination with the third protective layer 7a (described below) to adjust the color tone of the surface-reflected light. The second protective layer 6a has a thickness preferably within the range of 50–80 nm, and most preferably within the range of 65–75 nm.

The third protective layer 7a formed on the second protective layer 6a is made of aluminum oxide to prevent the permeation of moisture introduced from the top surface and to adjust the color tone of the surface-reflected light. The third protective layer 7a has a thickness preferably within the range of 20–60 nm, and most preferably within the range of 30–50 nm.

The fourth protective layer 8a formed on the third protective layer 7a is made of silicon dioxide to reinforce the resistance to scratching etc. The fourth protective layer 8a has a thickness preferably within the range of 7–23 nm, and most preferably within the range of 7–15 nm. If the thickness is smaller than 7 nm, sufficient resistance to scratching etc. is not obtained. If the thickness is larger than 23 nm, the color tone of the reflected light is deteriorated.

EXAMPLE 1

In order to manufacture a high-reflectivity surface reflecting mirror having the structure of FIG. 1, a first under layer 2a of silicon dioxide was first formed on a substrate 1a of a 2 mm-thick polycarbonate resin by vacuum evaporation at six different thicknesses of 0, 25, 50, 75, 100 and 125 nm. Then, the following layers were sequentially formed thereon: a chromium sulfide second under layer 3a of 7 nm thickness, a silver reflecting layer 4a of 100 nm thickness, a chromium sulfide first protective layer 5a of 3 nm thickness, a silicon dioxide second protective layer 6a of 75 nm thickness, an aluminum oxide third protective layer 7a of 38 nm thickness and a silicon dioxide fourth protective layer 8a of 12 nm thickness.

[Test for film adhesiveness]

The above samples of the high-reflectivity surface reflecting mirror were placed in a thermostat at 40° and 95% RH, and subjected to a peeling test using a cellophane tape every 24 hours until 216 hours are passed. Satisfactory results were obtained for all the samples in every peeling test.

[Test for resistance to corrosion]

The above samples were placed 100 mm above the surface of a 10 wt. % solution of $(NH_4)_2S$. After a lapse of 4 hours, variations of the surface state and the reflectivity at a wavelength of 400 nm of the samples were examined. No variation was found in the surface state before and after the test. Also the reflectivity variation at 400 nm was 0%.

Further, a color tone test revealed that the samples have an approximately neutral reflection color tone.

[Test for resistance to humidification]

After left for 24 hours in a thermostat at 60° C. and 95% RH, the surface state of the samples was observed. Results were as shown in Table 1.

TABLE 1

| Thickness of 1st under layer | Surface state (number of point-like defects) |
| --- | --- |
| 0 nm | many |
| 25 nm | few |
| 50 nm | none |
| 75 nm | none |
| 100 nm | few |
| 125 nm | many |

It is understood from the results of Table 1 that no point-like defects occur when the thickness of the silicon dioxide first under layer 2a is within the range of 50–75 nm, and in such a case the high-reflectivity surface reflecting mirror of the invention as a resin optical part exhibits a superior resistance to humidification.

Although in the first embodiment the four protective layers 5a–8a are formed on the reflecting layer 4a, the number of protective layers and their structure are not limited to those of the first embodiment.

As described above, according to the first embodiment, there can be obtained the high-reflectivity surface reflecting mirror as a resin optical part in which no defects occur even under such severe conditions for testing the resistance to humidification as 60° C., 95% RH and 24 hours, by inserting the silicon dioxide under layer between the resin substrate and the surface reflecting films.

FIG. 4 shows a surface reflecting mirror having a five-layer reflecting film structure. As shown in the figure, a surface reflecting mirror 21 is formed by sequentially laying, on a resin substrate 22, a chromium oxide under layer 23, an aluminum reflecting layer 24, a silicon dioxide first protective layer 25, a titanium oxide second protective layer 26 and an aluminum oxide third protective layer 27.

In this film structure, adhesion of the aluminum reflecting layer 24 to the resin substrate 22 is improved, so that the film structure does not peel off in the tape test.

However, even the above surface reflecting mirror 21 has the following problem. That is, when the surface reflecting mirror 21 is placed in a high temperature, high humidity atmosphere at 60° C. and 90% RH for a long period, point-like defects (local peeling off the film structure from the resin substrate 22) occur due to the thermal expansion or damping expansion of the resin. Although the point-like defects gradually disappear when the surface reflecting mirror 21 is again placed in a usual atmosphere, they may deteriorate the adhesiveness of the reflecting film structure to the resin substrate 22.

Figure 5:
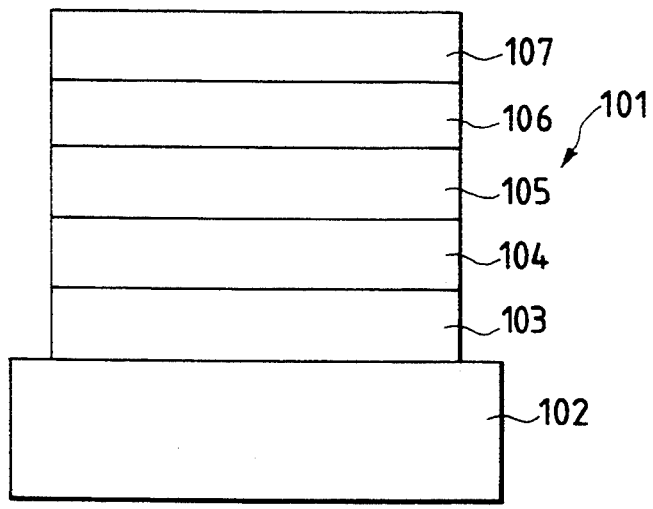
FIG. 5 is a side view showing a surface reflecting mirror according to a second embodiment of the invention.

FIG. 5 is a side view showing a surface reflecting mirror according to a second embodiment of the invention. As shown in the figure, a surface reflecting mirror 101 is formed by sequentially laying, on a resin substrate 102, an under layer 103, a reflecting layer 104, a first protective layer 105, a second protective layer 106 and a third protective layer 107.

The substrate 102 of the surface reflecting mirror 101 is made of a resin material without any specific limitations thereon. The resin material may be a polycarbonate resin, polyacetal resin, acrylic resin, polystyrene resin, polyimide resin, polyethylene terephthalate resin, plybutylene terephthalate resin, ABS resin, or the like.

The under layer 103 made of silicon dioxide serves not only to improve the adhesiveness of the reflecting layer 104 to the resin substrate 102 but to lessen, by the compressive stress occurring when the under layer 103 is formed, the influence of the thermal expansion or damping expansion of the resin substrate 102. The thickness of the under layer 103 is properly determined in accordance with a force of bending the surface reflecting mirror 101 that originates from the thermal expansion coefficient and damping expansion coefficient of the selected resin substrate 102, the tensile stress imposed by the reflecting layer 104 and the protective layers 105-107 on the substrate 102 and other factors. The thickness of the under layer 103 is usually within the range of 50-350 nm, and preferably within the range of 50-300 nm.

The reflecting layer 104 is made of aluminum, and has a thickness usually within the range of 50-250 nm, and preferably within the range of 100-200 nm. The thickness smaller than 50 nm is not appropriate because in such a case the surface reflecting mirror 101 becomes like a half mirror.

The first protective layer 105 is made of silicon dioxide, and serves as a low refractive index layer for enhancing the reflection in the visible range. The thickness of the first protective layer 105 is usually within the range of 42-133 nm, and preferably within the range of 70-105 nm.

The second protective layer 106 is made of at least one material selected from titanium oxide, tantalum oxide and zirconium oxide, and serves as a high refractive index material for enhancing the reflection in the visible range. The thickness of the second protective layer 106 is usually within the range of 24-89 nm, and preferably within the range of 45-70 nm.

The third protective layer 107 is made of aluminum oxide, and serves to protect the second protective layer 106 which is deficient in durability. The thickness of the third protective film is usually within the range of 10-110 nm, and preferably within the range of 10-80 nm. If the thickness is smaller than 10 nm, sufficient durability is not obtained. If the thickness exceeds 110 nm, the third protective layer 107 reduces the reflection enhancement effect created by the combination of the first and second protective layers 105 and 106.

EXAMPLES 2-4

A surface reflecting mirror 101 as shown in FIG. 5 was manufactured by forming the following layers on a polycarbonate resin substrate 102 of 2 mm in thickness by vacuum evaporation: a silicon dioxide under layer 103 having a thickness of 50 nm (example 2), 200 nm (example 3) or 350 nm (example 4), an aluminum reflecting layer 104 of 100 nm in thickness, a silicon dioxide first protective layer 105 of 52 nm in thickness, a titanium oxide second protective layer 106 of 33 nm in thickness, and an aluminum oxide third protective layer 107 of 45 nm in thickness.

EXAMPLES 5-7

A surface reflecting mirror 101 as shown in FIG. 5 was manufactured by forming the following layers on a polycarbonate resin substrate 102 of 2 mm in thickness by vacuum evaporation: a silicon dioxide under layer 103 having a thickness of 50 nm (example 5), 200 nm (example 6) or 350 nm (example 7), an aluminum reflecting layer 104 of 100 nm in thickness, a silicon dioxide first protective layer 105 of 52 nm in thickness, a tantalum oxide second protective layer 106 of 36 nm in thickness, and an aluminum oxide third protective layer 107 of 45 nm in thickness.

EXAMPLES 8-10

A surface reflecting mirror 101 as shown in FIG. 5 was manufactured by forming the following layers on a polycarbonate resin substrate 102 of 2 mm in thickness by vacuum evaporation: a silicon dioxide under layer 103 having a thickness of 50 nm (example 8), 200 nm (example 9) or 350 nm (example 10), an aluminum reflecting layer 104 of 100 nm in thickness, a silicon dioxide first protective layer 105 of 52 nm in thickness, a zirconium oxide second protective layer 106 of 40 nm in thickness, and an aluminum oxide third protective layer 107 of 45 nm in thickness.

REFERENCE EXAMPLE 1

A surface reflecting mirror was manufactured by forming the following layers on a polycarbonate substrate of 2 mm in thickness by vacuum evaporation: an aluminum reflecting layer of 100 nm in thickness, a silicon dioxide first protective layer of 52 nm in thickness, a titanium oxide second protective layer of 33 nm in thickness, and an aluminum oxide third protective layer of 45 nm in thickness.

REFERENCE EXAMPLE 2

A surface reflecting mirror 21 as shown in FIG. 4 was manufactured by forming the following layers on a polycarbonate substrate 22 of 2 mm in thickness by vacuum evaporation: a chromium oxide under layer 23 of 15 nm in thickness, an aluminum reflecting layer 24 of 100 nm in thickness, a silicon dioxide first protective layer 25 of 52 nm in thickness, a titanium oxide second protective layer 26 of 33 nm in thickness, and an aluminum oxide third protective layer 27 of 45 nm in thickness.

REFERENCE EXAMPLES 3-5

Figure 10:
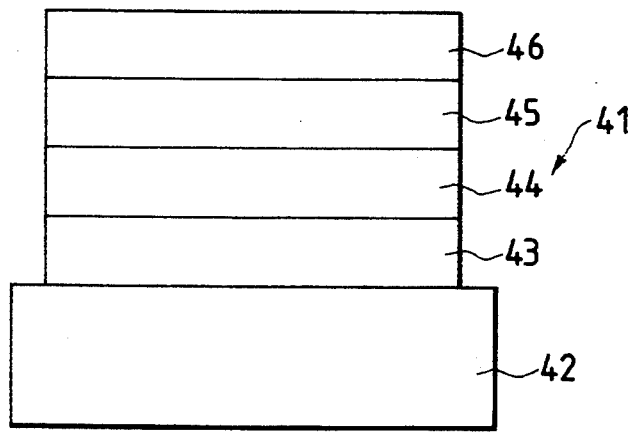
FIG. 10 is a side view showing surface reflecting mirrors of reference examples 3-5.

A surface reflecting mirror 41 as shown in FIG. 10 was manufactured by forming the following layers on a polycarbonate substrate 42 of 2 mm in thickness by vacuum evaporation: a silicon dioxide under layer 43 of 200 nm in thickness, an aluminum reflecting layer 44 of 100 nm in thickness, a silicon dioxide first protective layer 45 of 95 nm in thickness, and a 65 nm thick second protective layer 46 of titanium oxide (reference example 3), tantalum oxide (reference example 4) or zirconium oxide (reference example 5).

The samples of examples 2-10 and reference examples 1-5 were subjected to the following tests.

[Test for resistance to scratching]

The surface of a surface reflecting mirror sample was subjected to 20 times of go-and-return rubbing with a pressure of about 0.5 kg/cm$^2$ using lens-cleaning paper that had been immersed in a mixture solvent of ether and methanol, and was observed to find abnormalities such as a scratch.

[Test for film adhesiveness]

A cellophane tape was stuck to a surface reflecting mirror sample, and then removed therefrom strongly. The surface of the sample was observed to find abnormalities such as peeling.

[Test for resistance to humidification]

A surface reflecting mirror sample was placed in a thermostat at 60° C. and 90% RH for 48 hours, and was observed to find abnormalities such as a crack and a point-like defect.

Results of the above tests were as shown in Table 2. Mark "o" in Table 2 indicates that no abnormality was found.

TABLE 2

|  | Test for resistance to scratching | Test for film adhesiveness | Test for resistance to humidification |
| --- | --- | --- | --- |
| Example 2 | o | o | o |
| Example 3 | o | o | o |
| Example 4 | o | o | o |
| Example 5 | o | o | o |
| Example 6 | o | o | o |
| Example 7 | o | o | o |
| Example 8 | o | o | o |
| Example 9 | o | o | o |
| Example 10 | o | o | o |
| Reference example 1 | o | peeling | point-like defects |
| Reference example 2 | o | o | point-like defects |
| Reference example 3 | large scratch | o | o |
| Reference example 4 | large scratch | o | o |
| Reference example 5 | large scratch | o | o |

As described above, the surface reflecting mirror according to the second embodiment is advantageous in the resistance to scratching because the third protective layer as the uppermost layer is made of aluminum oxide. In addition, by virtue of the under layer made of silicon dioxide, point-like defects can effectively be prevented from occurring between the resin substrate and the film structure when the surface reflecting mirror is placed in a high temperature, high humidity atmosphere. Therefore, the surface reflecting mirror can be provided which can suitably be used for cameras, telescopes, microscopes, laser printers, bar code readers, etc.

The foregoing description of the preferred embodiments of the invention are presented for purposes of illustration and description. It is not intended to limit the scope of the invention to those embodiments.

What is claimed is:

1. A surface reflecting mirror comprising:
   a resin substrate;
   a first under layer made of silicon dioxide and formed on the resin substrate;
   a second under layer made of chromium sulfide and formed on the first under layer;
   a reflecting layer made of silver and formed on the second under layer; and
   a protective layer formed on the reflecting layer.

2. The surface reflecting mirror of claim 1, wherein the protective layer comprises a first protective layer made of chromium sulfide and formed on the reflecting layer, a second protective layer made of silicon dioxide and formed on the first protective layer, a third protective layer made of aluminum oxide and formed on the second protective layer, and a fourth protective layer made of silicon dioxide and formed on the third protective layer.

3. The surface reflecting mirror of claim 2, wherein thicknesses of the first and second under layers are within ranges of 25-100 nm and 1-35 nm, respectively, a thickness of the reflecting layer is within a range of 50-250 nm, and thicknesses of the first to fourth protective layers are 1-10 nm, 50-80 nm, 20-60 nm and 7-23 nm, respectively.

* * * * *